H. G. HILL.
MECHANICAL MOVEMENT.
APPLICATION FILED MAR. 5, 1919.

1,342,170.

Patented June 1, 1920.

INVENTOR.
Hugh G. Hill,
by Wilhelm Parker.
ATTORNEYS.

UNITED STATES PATENT OFFICE.

HUGH G. HILL, OF WHEELING, WEST VIRGINIA, ASSIGNOR, BY MESNE ASSIGNMENTS, TO WHITAKER-GLESSNER COMPANY, OF WHEELING, WEST VIRGINIA.

MECHANICAL MOVEMENT.

1,342,170.  Specification of Letters Patent.  Patented June 1, 1920.

Application filed March 5, 1919. Serial No. 280,688.

*To all whom it may concern:*

Be it known that I, HUGH G. HILL, a citizen of the United States, residing at Warwood, Wheeling, in the county of Ohio and State of West Virginia, have invented a new and useful Improvement in Mechanical Movements, of which the following is a specification.

This invention relates to mechanical movements of the kind adapted to produce an oscillatory motion.

The objects of the invention are to produce a mechanical movement of improved construction whereby an oscillatory motion is produced by means of a rotating member; also to provide a device of this kind in which the oscillating member moves with the rotary driving member during a part of the rotation of the driving member and is then returned to its initial position; also to improve devices of this kind in other respects hereinafter specified.

Figure 1:
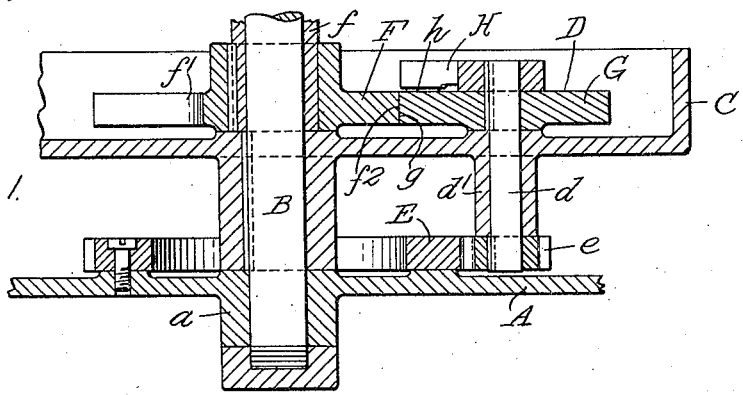
Figure 1 is a central sectional elevation of a mechanical movement embodying the invention.
Figure 2:
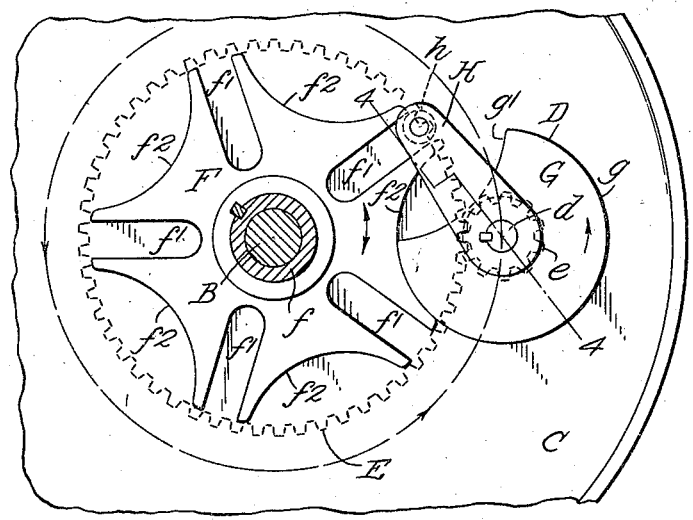
Fig. 2 is a top plan view thereof.
Figure 3:
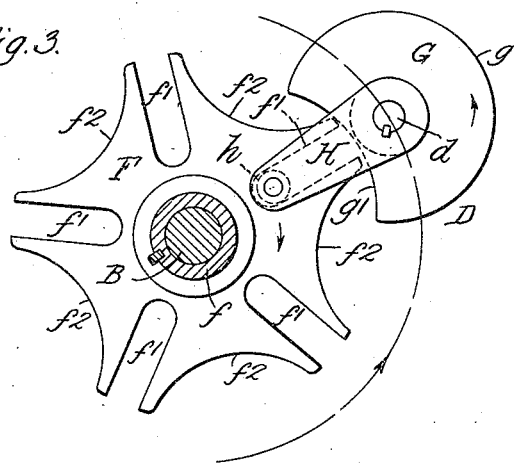
Fig. 3 is a fragmentary top plan view thereof showing the parts in different positions.
Figure 4:
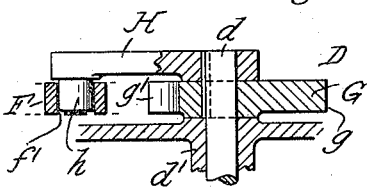
Fig. 4 is a fragmentary sectional elevation thereof on line 4—4, Fig. 2.

Briefly stated, the invention includes a rotary driving member having a planetary member or star lock and actuating device mounted thereon, and a Geneva or star wheel which is alternately driven in opposite directions by engagement with the planetary member, giving the star wheel an oscillatory movement, during a part of which movement the star wheel rotates at the same speed and in the same direction as the driving member, and during the other part of which the star wheel is returned to its initial position.

In the embodiment of the invention shown in the drawings: A represents a fixed frame or base on which the parts of the mechanism are mounted, the frame including a bearing $a$ for one end of a driving shaft B. C represents a driving disk, plate or member which may be of any suitable or desired construction and which is keyed or otherwise secured to the driving shaft B to receive rotary motion from the driving shaft.

A planetary member D is suitably journaled in the driving member C and is provided, in the construction shown, with a shaft $d$ journaled in an extension or bearing $d'$ of the driving member C, and a pinion $e$, also secured to the shaft $d$, is adapted to mesh with a fixed gear E which is suitably secured to the base A of the mechanism. The rotation of the driving member C causes the pinion $e$ to be driven from the fixed gear E, giving the planetary member D a motion of rotation about the axis of the shaft $d$, as well as carrying the planetary member about the axis of the shaft B.

The driven member of the mechanism is in the form of a star wheel F which is suitably journaled concentrically with the driving member C. In the construction shown, the star wheel F is secured to a sleeve $f$ arranged on the shaft B, concentric therewith. The star wheel is provided with the usual slots $f'$ and arc-shaped concave faces $f^2$, and the planetary member D includes a star lock disk G having a peripheral portion $g$ corresponding in curvature to the faces $f^2$ of the star wheel and having a recessed portion $g'$ to permit the star wheel to move relatively to the disk G when the locking surfaces $g$ and $f^2$ are out of locking engagement. The planetary member also includes an actuating arm H adapted to turn the star wheel independently of the driving member, for example in a direction opposite to the direction of rotation of the driving member C, when the locking faces $g$ and $f^2$ are out of locking engagement. The actuating arm, in the construction shown, is provided with an anti-friction roller $h$ which is adapted to enter into the slots $f'$ and to cause the star wheel to be moved to its initial position. The star lock and actuating member D may be of any other suitable construction, if desired. The oscillatory motion of the star wheel F may be transmitted through the sleeve $f$ to any desired member or mechanism.

In the operation of the mechanism, the continuous rotation of the driving member C produces a rotation of the planetary member D about the axis of its shaft $d$, as well as about the shaft B. As the planetary member travels about the star wheel F, the star wheel will be carried with the driving member during the interval of time that the locking faces $g$ and $f^2$ are in locking engagement, and as soon as the arm H engages in one of the slots f' of the star wheel, the star wheel will be returned to its initial position. This gives the star wheel an oscillatory motion through an arc of a circle equal to the arc between two of the slots of the star wheel. During the movement of the star wheel with the driving member C, the speed of rotation of the star wheel will be the same as that of the driving member, and the return movement of the star wheel to its initial position will be at a higher rate of rotation than the movement of the same with the driving member.

I claim as my invention:

1. The combination of a rotary driving member, a star wheel pivoted concentrically with said driving member, and a planetary member mounted on said driving member and including a star lock member adapted to engage said star wheel to cause the same to move with said driving member through a part of a revolution, and an actuating member for causing said star wheel to be rotated in the reverse direction.

2. The combination of a Geneva movement comprising a star wheel and a star lock and actuating member, and means for giving said member a planetary motion about said star wheel whereby said star wheel receives an oscillatory movement.

3. The combination of a Geneva movement comprising a star wheel and a star lock and actuating member, means for moving said member about said star wheel, and means for rotating said member about its own axis in the same direction as the direction of rotation of said member about the axis of said star wheel, whereby said star wheel receives an oscillatory motion.

4. The combination of a Geneva movement comprising a star wheel and a star lock and actuating member, a driving member rotatable about the axis of said star wheel and on which said star lock and actuating member is mounted, means for rotating said star lock and actuating member about its own axis to give said star wheel an oscillatory motion.

5. The combination of a rotary driving member, a star wheel pivoted concentrically with said driving member, a star lock and actuating member rotatably mounted on said driving member, and a fixed gear for causing said star lock and actuating member to rotate about its own axis, said star lock and actuating member giving said star wheel an oscillatory motion.

6. The combination of a rotary driving member, a star wheel pivoted concentrically with said driving member, a planetary member pivoted on said driving member in operative relation to said star wheel, said planetary member including a star lock and a star actuating device, and a fixed gear with which said planetary member engages and which causes the same to rotate about its axis, said lock and actuating member causing said star wheel to move with said driving member during one part of the movement of said star wheel and to cause the star wheel to move to another position relatively to said driving member during another part of the movement of said star wheel.

7. The combination of a rotary driving member, a Geneva movement including a star wheel and a star lock and actuating member, said rotary driving member being rotatable concentrically with said star wheel and said star lock and actuating member being mounted on said driving member, and means for rotating said star lock and actuating member causing said star wheel to alternately move with said driving member and then to move back to its initial position.

Witness my hand, this 27th day of February, 1919.

HUGH G. HILL.

Witnesses:
E. E. BROSHAW,
WALTER HOLMES.